United States Patent [19]

Nakagome et al.

[11] 3,818,450

[45] June 18, 1974

[54] CONTROL SYSTEM OF AN ELECTRONIC EXCHANGE AND A COMMON CHANNEL SIGNAL CONTROLLER FOR AN ELECTRONIC EXCHANGE

[75] Inventors: Yukio Nakagome, Yokohama; Hiroichi Teramura; Yasuo Fukata, both of Tokyo; Hiromichi Mori, Lawasaki; Shoichi Sugita, Tokyo, all of Japan

[73] Assignee: Kokusai Denshin Denwa Kabushiki Kaisha, Tokyo, Japan

[22] Filed: May 17, 1973

[21] Appl. No.: 361,309

[30] Foreign Application Priority Data

May 22, 1972 Japan ................................ 47-50522

[52] U.S. Cl. ........................ 340/147 R, 340/147 CV

[51] Int. Cl. ................................................ H04q 5/00

[58] Field of Search ...................... 340/147 R, 147 C

[56] References Cited

UNITED STATES PATENTS 3,059,228 10/1962 Beck ............................ 340/147 CV

*Primary Examiner*—Harold I. Pitts

*Attorney, Agent, or Firm*—Paul & Paul

[57] ABSTRACT

A control system of an electronic telephone or telegraph exchange for a common channel signalling system in which an exclusive data channel for the signal for each speed channel is commonly provided. The control facility of said electronic exchange is shared by a common channel signal controller and a central processing unit. The former processes signal relating mainly to the transmission of signal such as serial-parallel conversion, error check, etc. while the latter processes signal relating to the copy. Said common channel signal controller comprises memory system and operates on time divisional basis.

2 Claims, 5 Drawing Figures

CONTROL SYSTEM OF AN ELECTRONIC EXCHANGE AND A COMMON CHANNEL SIGNAL CONTROLLER FOR AN ELECTRONIC EXCHANGE

BACKGROUND OF THE INVENTION

This invention relates to a control method of an electronic exchange, particularly to a control method of the electronic exchange which adopts the common channel signalling system and a common line signal controller used in relation to the above method.

Recently for the purpose to cope with the quantitative and qualitative requests of communication in accordance with the complication of the social structure, also in the field of exchanges instead of the prior exchange with mechanical control, the electronic exchanges which adopt common control systems with electronic devices are developed. The electronic exchanges can not only switch a lot of telephone circuits at very high speed, but also provide easily the new services of abbreviated dialing, call waiting, subscriber dialing for international call etc., and further provide the function of the exchange in the video communication, data communication and the integrate communication networks which process the combined services of the above mentioned communications. The electronic exchanges, therefore, are ones with great future.

There have been proposed many kinds of electronic exchanges. The system in relation to this invention concerns with the systems in which mechanical switches, for example cross-bar switches, are used for speech path and electronic devices controlled on time divisional basis by stored programs. And in relation to signalling system, this concerns with the systems which adopt common channel signalling system, for example No. 6 signalling system recommended by CCITT (International Telegraph and Telephone Consultative Committee).

In prior electronic exchanges the most part of their control function is owe to a central processing unit and only a few part of the control function is owe to signal units installed at each circuit as an external unit of a central processing unit. But the program controlled central processing units are intrinsically not good at executing the process to be severely requested real time operation at high speed. Therefore, in the electronic exchanges connected with a great number of common channel signal links, high speed data circuits, the prior arts have the disadvantage that the load of the central processing unit to be requested for processing the common channel signal links is extraordinary large.

SUMMARY OF THE INVENTION

An object of the present invention is to improve said disadvantage of the prior electronic exchanges.

Another object of the invention is to relieve the central processing unit from the job of severe real time operation.

The feature of the electronic exchange according to the invention to achieve said objects is that the control functions of the electronic exchange are shared by the common channel signal control device and the central processing unit. The common channel signal controller executes the signal controls relatively simple but requested high speed control, and the central processing unit is allotted only the functions which are requested high grade logical operations and large memory capacity, but not requested severe real time operation.

BRIEF DESCRIPTION OF THE DRAWINGS

Referring to the drawings we explain an embodiment according to the invention as follows.

DESCRIPTION OF THE PREFERRED EMBODIMENTS

Figure 1:
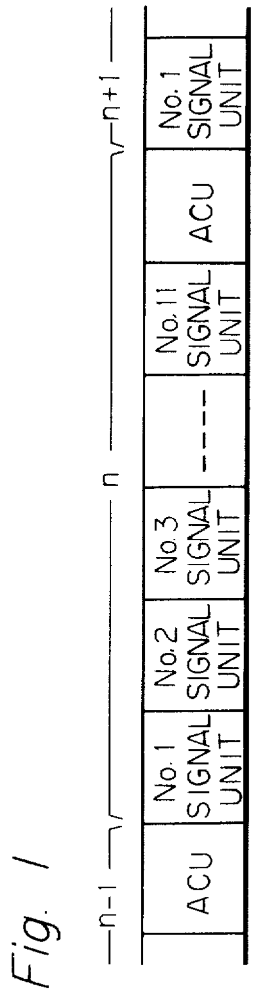
FIG. 1 is a block diagram of the signal.

At first we explain No. 6 signalling system for an example of common channel signalling systems using FIG. 1. In No. 6 signalling system, exclusive both way channels are equipped in addition to speech channels for the purpose of signal transmission, and the signal transmission rate is 2400 bps. As shown in FIG. 1, 12 signal units compose one signal block and the signals are transmitted block by block. The 11 signal units (No. 1 – No. 11) of the 12 ones are the units which transmit the signal related directly to speech channel, and the last unit (No. 12) is acknowledgement signal unit. Each signal unit is formed by 28 bits of which contents of 20 signal bits and 8 check bits. The acknowledgement signal unit contains eleven acknowledge indicators to inform a transmitting office of "normal" or "error" reception of the corresponding eleven signal units of a signal block which has finished reception just before. The transmitting office can know whether the signals which said office has transmitted are received right or not. When the "error" reception occurred, the corresponding signal units are transmitted again. The signals of the block formation as shown in FIG. 1 is always transmitted to the signal channel, and when there is no significant signal to be transmitted, the "empty" signals are transmitted.

Figure 2:
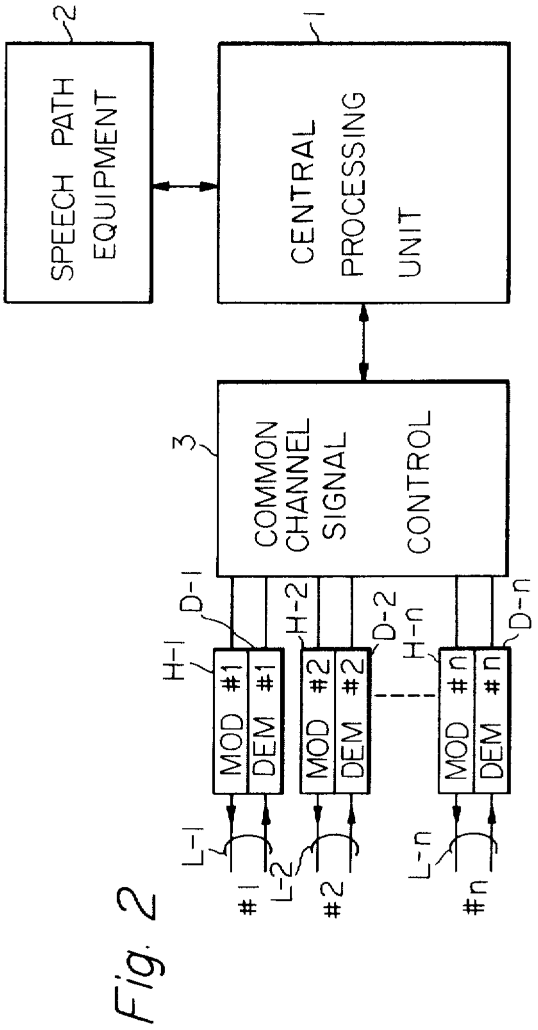
FIG. 2 is a block diagram showing an embodiment that the invention is applied to an electronic exchange.

FIG. 2 shows a block diagram of the present invention. In FIG. 2, 1 shows the central processing unit of the electronic exchange, 2 shows the channel device comprising channel switches, trunk units and signal units, 3 shows the common channel signal controller. H–1, H–2, ....., H–n and D–1, D–2, ....., D–n are the modulators and the demodulators for the signal links L–1, L–2, ....., L-n respectively. The functions of the common channel signal controller are summarized as follows.

a. to accumulate the results of checking the errors of the received signals and transmits the acknowledge signal automatically.

b. to insert the "empty" signals to the transmitting signals when there is no significant signal to be transmitted.

c. to distinguish the "empty" signals in the received signals and prevent the sending of the "empty" signals to the central processing unit.

Comparing with the fact that the signal devices according to prior arts operate only serial to parallel conversion and check of the errors of the signals, the common channel signal controller 3 according to the present invention performs the signal processing as said term (a) – (c). Therefore, the load of the central processing unit 1 is considerably reduced, and the operation which the central processing unit 1 has to perform in relation to signal processing is only to retransmit the signals when the errors of the transmission of the signals occur.

In FIG. 2 the signals transmitted through a signal link, for example signal link L–1, are demodulated in the demodulator D–1 and sent in a series form into the common channel signal controller 3 bit by bit. The common channel signal controller 3 composes one signal unit by accumulating the received bits and tests the check bit of the signal unit. When the composition finishes the common channel signal controller 3 judges whether the said signal unit is "empty" signal unit or not and sends said composed signal unit into the central processing unit 1 unless said signal unit is "empty". If said signal unit is "empty", it is abandoned. If the signal unit from the common channel signal controller 3 is one except acknowledge signal, the central processing unit 1 performs call processing and controls the speech path equipment 2. If the said signal unit is the acknowledgement signal unit, the central processing unit 1 examines acknowledgement indicators and if necessary, executes the retransmission processing by reading out the signal units received in error from the copy buffer described in the following. The testing results of the check bits of said received signals are stored into the exclusive buffer memory of the common channel signal controller 3 at each time when the reception of one signal unit finishes, and after the testing results of one signal block are stored the common channel signal controller 3 reads out the stored informations about these testing results and compose the acknowledgement signal unit. The signals transmitted from the central processing unit 1 (involving the signals retransmitted) are transferred in parallel into the common channel signal controller 3 by a unit of signal unit. The common channel signal controller adds the check bits into the signals transferred from the central processing unit 1 and transfers in series the signals into the modulator H–1. In the case that at the point when the common channel signal controller 3 finishes the transmitting controls the signal to be subsequently transmitted are not transferred from the central processing unit 1, the common channel signal controller 3 composes the "empty" signals and transmits them. When the last signal unit (signal unit No. 11 in FIG. 1) of the block of the common channel signal controller is transmitted, the common channel signal controller 3 interrupts the signal transfer from the central processing unit 1 to the common channel signal controller 3 and performs the transmitting control of the acknowledgement signal unit composed in the way described in the above. An the common channel signal controller 3 sends back to the central processing unit 1 all the signals transmitted (including empty and acknowledgement signal units). The central processing unit 1 stores these returned signal units into the special area in the memory unit, called copy buffer, in order. Therefore, when the block number and the unit number of the signal for retransmission are designated, the central processing unit 1 can easily read out the corresponding signal unit from the copy buffer. The synchronizing control of the received signals is automatically performed by the common channel signal controller 3 without the control of the central processing unit 1.

Figure 3:
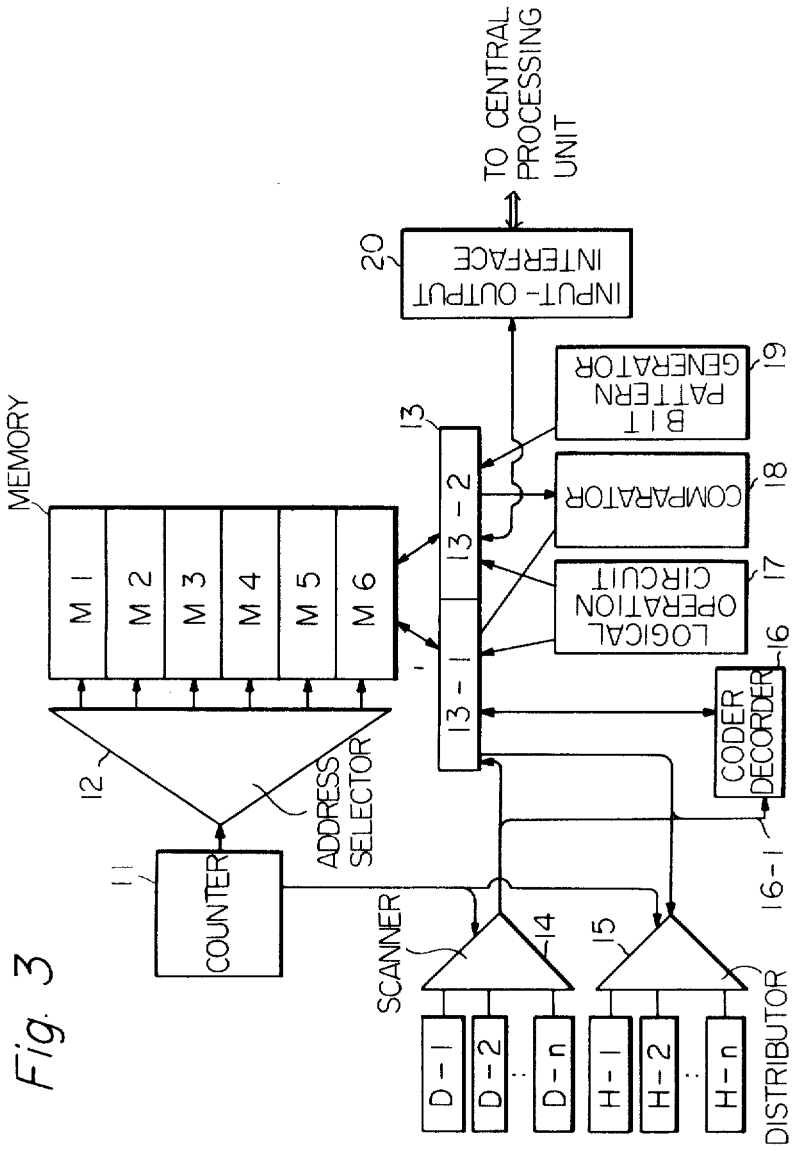
FIG. 3 is an example of a composition of the common line signal controller 3 shown in FIG. 2.

FIG. 3 shows a block diagram of an example of a composition of the common channel signal controller 3. In FIG. 3 a block 11 is a counter circuit to indicate the kinds of control to be executed and the signal links to be controlled in predetermined order, a block 12 is an address selector to select the addresses in the memory according to the output signal from the counter circuit 11, and a block 13 is a register for reading out the contents of the memory and can read out two words from the memory M and stores them in the parts 13–1 and 13–2 simultaneously. A block 14 is a scanning circuit to scan the received signals at the demodulators D–1, D–2, ..., D-n, a block 15 is a distribution circuit to distribute the transmitting signals to the modulator H–1, H–2, ..., H-n. The scanning circuit 14 and the distribution circuit 15 are able to select the demodulator or the modulator designated by the counter circuit 11. A block 16 is a code.decoder which is composed of the shift register for testing the check bits of the received signals and for generating check bits and adding them to the transmitting signals. The coder.decoder 16 generates or tests the check bits by providing the transmitting or received signals bit by bit from the input terminal 16–1, and also has the function that it can transfer the information on the shift register (called current state of 16 hereinafter) to the appointed position of the register 13 in parallel or set the information on the appointed position of the register 13 to said shift register. A block 17 is a logical operation circuit which gives the information on the register 13 logical operations and renews said information, a block 18 is a comparator which judges the congruity between the information on the register 13 and the predetermined bit pattern by comparing them, a block 19 is a bit pattern generator which sets the predetermined bit pattern on the register 13, and a block 20 is an input-output interface which controls the information transfer between the central processing unit 1 and the register 13. A block M is a memory which stores temprarily the control statuses of a plurality of signal channels. The information showing the control device relating to each signal channel composes of six parts which are stored in the areas M1, M2, ..., M6 of the memory M respectively.

Figure 4:
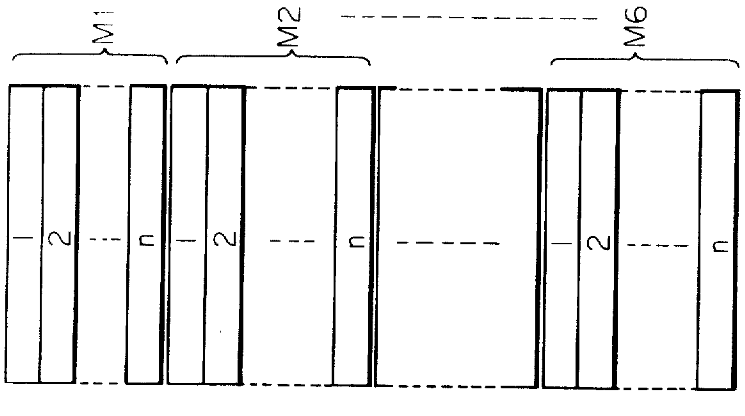
FIG. 4 is an example of a format in the memory M in the example shown in FIG. 3.

FIG. 4 shows an example of a composition of the memory M. Each subarea M1, M2, .... M6 is composed of n words (n is the number of the common channel signal links which can be terminated in a common channel signal controller), and each word stores the control information relating to the signal link L–1, L–2, ...., L-n.

Figure 5:
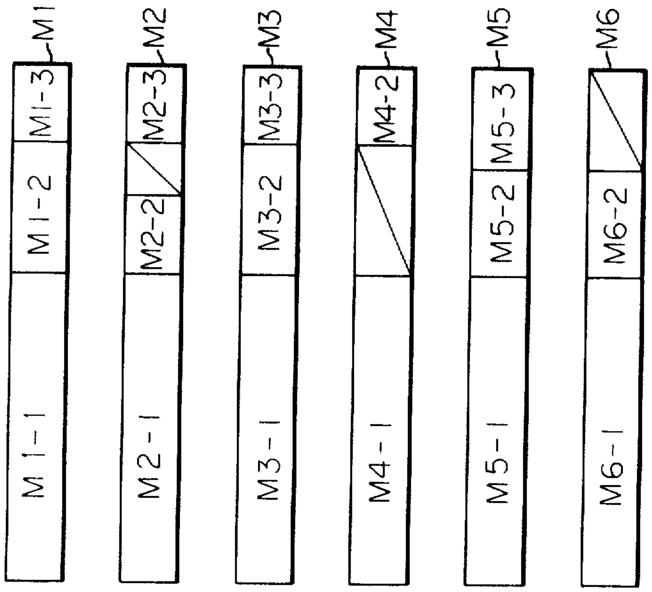
FIG. 5 is an arrangement of the informations in the memory M.

FIG. 5 shows the contents of the information stored in the subareas M1, M2, ...., M6. In the M1, M1–1 is the area for composing the received signal unit by storing the received signal bit one by one. M1–2 is the area for storing the current state of the coder.decoder 16 to test the check bits of the received signal units, and M1–3 is the area for storing the control status about the receiving controls of the signals. In M2, M2–1 is the area for storing temporarily the received signal unit, which has been finished the composition at the area M1–1, until it is transferred to the common channel signal controller 3. M2–2 is the area for memorizing the test result of the check bits of the signal unit stored in the area M2–1, and M2–3 is the area for memorizing the control status about the transfer control to transfer the received signals to the central processing unit 1. In M3, M3–1 is the area for memorizing the transmitting signal unit, and the signal unit stored in this area is transferred bit by bit to the modulator. M3–2 is the area to secure the current state of the coder.decoder 16 to supply the check bits to the signal unit transmitted, and M3–3 is the area for memorizing the control status about transmitting control of the signals. In M4, M4–1 is the area for storing the signal unit which is to be transmitted after the sending of signal unit from M3–1 finishes, M4–2 is the area for memorizing the control status about the transfer control to transfer the transmitted signal from the central processing unit 1. In M5, M5–1 is the area for rearranging the test results of the check bits which are tested by the coder.decoder 16 each time M1–1 receives one signal unit. M5–2 is the counter to show the address of the signal unit under being received in the signal block, M5–3 is the counter for counting the number of times of sequential error of the received signal unit. In M6, M6–1 is the area for storing the test result of the check bits of all signal units of the signal block which has been received just before, and M6–2 is the counter for counting the address of the signal unit under being transmitted in the signal block.

Next the operation of the common channel signal controller 3 will be explained.

At first the function about the receiving control of the signals is explained. In FIG. 3, when the demodulator D–1 connected with the signal link L–1, for example, is selected by the counter circuit 11 through the scanning circuit 14, the output of the demodulator D-1 is transferred to the register 13–1 and coder.decoder 16 through the scanning circuit 14. Simultaneously, the address selector 12 selects the areas relating to the link L-1 from the areas M1 and M5 in the memory M by the signal from the counter circuit 11 and read out the information of these areas onto the areas 13–1, 13–2 of the register 13. The part M1-1 of the information of M1 read out onto the area 13–1 provided the operation of the shift register which stores the received signal from the demodulator D–1 to convert the received serial signal to parallel signal. The part M1–2 of the information of M1 read out onto the area 13–1 is transferred to the coder.decoder 16 in parallel and is made the current state of the coder.decoder 16. The received signals transferred from the demodulator D–1 through the scanning circuit 14 are fed to the coder.decoder 16 through the signal input terminal 16–1 and renew the current state of the coder.decoder 16, and this current state is returned to the part M1–2 on the area 13–1. During the signal unit is being received (after the above operation finishes) the operation in one time slot finishes when the informations on the area 13–1, 13–2 are returned to the addresses relating to the link L–1 of the areas M1, M5 in the memory M. In said operation if the reception of one signal unit has completed the information on the area 13–1 and the testing results of the check bits of said signal unit obtained by the coder.decoder 16 are written into the address relating to the channel L–1 of the area M2 in the memory M. Simultaneously, the test results of the check bits of said signal unit are transferred also to the area 13–2 and are stored into the part of M5–1 of the information area of the area M5 which is now read out onto the area 13–2. If the signal unit which completed the reception is not the last signal unit of the signal block, the operation in one time slot finishes after the informations on the areas 13–1, 13–2 are written into the addresses relating to the link L–1 of the areas M1, M2 in the memory M. In the above operation if the signal unit which completed the reception is the last signal unit of the signal block, the information on the area 13–2 is written into the address relating to the link L–1 of the area M6 in the memory M after the above operation. And the operation in one time slot finishes after the informations on the areas 13–1, 13–2 are written into the addresses relating to the link L–1 of the areas M1, M5 in the memory M. As described above, every bit of the received signals is stored into the area M1–1 in order and transferred in parallel to the area M2–1 with the test results of the check bits each time the reception of one signal unit completes. Simultaneously the test results of the check bits of the received signal units are stored into the area M5–1 and all test results of one signal block and transferred together to the area M6–1 each time the reception of one signal block completes.

Next, a received signal transfer control by which the received signal units are transferred to the central processing unit 1 is explained. The address selector 12 selects the address relating to the link L–1, for example, of the area M2 from the memory M by the signal from the counter circuit 11 and read out the information of this address onto the register area 13–2. The part M2–1 of the area M2 read out onto the register area 13–2 (that is, the signal unit which completed the reception) is transferred to the comparator 18 where it is compared with the "empty" signal. If this is the "empty" signal, the information on the register area 13–2 is abandoned and the operation in one time slot finishes. If this is not the "empty" signal, the information relating to parts M2–1, M2–2 of the register area 13–2 are transferred to the input-output interface 20 which makes a control to input the said information to the central processing unit 1 and the operation in one time slot finishes when the information on the register areas 13–2 is returned to the particular address of the area M2 in the memory M. By the controls described above, the received signal units stored in the area M2–1 and the test results of the check bits stored in the area M2–2 are transferred to the central processing unit 1 in parallel.

Then, we explain the transmitting signal transfer control to transfer the transmitting signals from the central processing unit 1. According to the signal from the counter circuit 11 the address selector 12 reads out the memory areas relating to the link L–1, for example, of the areas M6 and M4 in the memory M onto the register 13–1 and 13–2. When the counter of the transmitted signal units M6–2 of the M6 read out onto the register 13–1 indicates that the next signal is the acknowledgement signal unit, the acknowledgement signal unit is composed by using the test results of the check bits of the received signal in the area M6–1 on the register 13–1 and said acknowledgement signal unit is transferred to the area M4–1. on the register 13–2. After these operation when the informations on the registers 13–1 and 13–2 are stored into memory areas relating to the link L–1 of the areas M6 and M4 in the memory M, this control finishes. If the next signal is not the acknowledgement signal unit, the pre-processing of the transfer control finishes when the information on the registers 13–1 and 13–2 are stored into the addresses relating to the link L–1 of areas M6 and M4 in the memory M after the transfer of the next signal from the central processing unit 1 is requested to the input-output interface 20. After the predetermined time interval, the memory areas relating to the link L–1 of the areas M6 and M4 are again read out on the register 13–1 and 13–2 and the existence of the output information from the central processing unit 1 is examined. If the output information exists, this information is transferred to the area M4–1 on the register 13–2. If the output information does not exist, the "empty" signal is generated in the bit pattern generator 19 and is transferred to the area M4–1 on the register 13–2. After these operations, the control of one unit finishes when the informations on the registers 13–1 and 13–2 are stored into the addresses relating to the channel L–1 of the areas M6 and M4 in the memory M. Through said control the signal unit which should be next transmitted is set on the area M4–1.

Then, we explain the transmitting control.

According to the output information from the counter circuit 11, the address selector 12 reads out the memory areas relating to the link L–1, for example, of the areas M3 and M4 in the memory M onto the register 13–1 and 13–2. Simultaneously, the distribution circuit 15 connects the modulator H–1 to the register 13–1 according to the control information from the counter circuit 11. On the area M3–1 of the informations read out onto the register 13–1, the signal unit under being transmitted at this time is set, and one bit to be next transmitted is transferred to the modulator H–1 through the distribution circuit 15 from said area M3–1. Simultaneously, the area M3–2 of the information on the register 13–1 is transferred in parallel to the coder.decoder 16 and becomes the current state of the coder.decoder 16, further, one bit which is transferred to the modulator H–1 from the area M3–1 is transferred to the input terminal 16–1 of the coder.decoder 16 and the current state of the coder.decoder 16 is renewed. This current state is returned to area M3–2 on the register 13–1. When the transmission of the transmitting signal unit set on the area M3–1 finishes, the information on the area M3–2 is transmitted in reversed polarity as the check bits (instead of the transmission of the information on the area M3–1). In this case the action of the coder.decoder 16 stops. Through said control, when the last element of the check bits is transmitted, the area M4–1 of the informations read out onto the register 13–2 is further transferred to the area M3–1 on the register 13–1. After these operations the control of one unit finishes when the informations on the registers 13–1 and 13–2 are stored into the addresses relating to the link L–1 of the areas M3 and M5 in the memory. By the operation described above, the informations stored in the area M4–1 are transferred in parallel to the area M3–1 and are transmitted in serial mode from the area M3–1 together with the check bits.

Next, we explain the copying control by which the signals processed by said transmitting control are returned to the central processing unit 1. According to the control information from the counter circuit 11, the address selector 12 reads out the memory areas relating to the link L–1, for example, of the area M4 in the memory M onto the register 13–2. Afer this process the area M4–1 of the informations on the register 13–2 is transferred to the input-output interface 20 and the transfer of this information to the central processing unit 1 is requested. Through said control, the signals units transferred from the central processing unit 1 and the "empty" signals generated in this device are returned to the central processing unit 1 in transmitting order, therefore the central processing unit 1 memorizes these signals and is able to respond to the request of the retransmission of the transmitted signals.

Next, we explain the synchronzing control. In the receiving control of the signals described above, the check bits of the received signals are always supervised. During the receiving control the area M5–3 of the area M5 read out onto the register 13–2 is used as the counter. When the "error" reception occurs, said counter is counted up one step and when the "normal" reception occurs said counter is reset to zero. By this action the number of times of the sequential "error" receptions of the received signals can be couned. When the logical operation circuit 17 judges that the content of said counter is beyond a predetermined value, the conditions of out of synchronization of the received signal can be detected. During the condition of out of synchronization the pattern of the received signals is compared with the "empty" signal pattern in the comparator 18 each time one bit is received, and the synchronizing control is performed by the verification of these two patterns being achieved after the control is changed to the normal receiving control.

Among the several kinds of the control described above only synchronizing control is performed at the same time as the receiving control but the other controls are executed in the predetermined order according to the control informations from the counter circuit 11. The time sharing control for a plurality of signal channels is easily realized by the method in which the areas M1, M2, ..., M6 are divided into the areas relating to a plurality of signal links, respectively, and the control informations corresponding to each signal link are stored in said areas and the counter circuit designates not only the kind of the controls but also the signal channel. The updated statuses of the control to each signal channel are memorized in the areas M1–3 (the control status about the receiving control), M2–3 (the control status about the received signal transfer control), M3–3 (the control status about the transmitting control) and M4–2 (the control status about the transmitting signal transfer control and the copying control), and the logical operation circuit 17 examines the control status in the present and renews it each time the control in each time slot is executed, therefore, the control about each signal link can continue. This common channel signal controller is specially effective for the processing which requires severe real time operation because this device performs the precise synchronized action in the predetermined order by the control of counter circuit 11.

As described above, by the common channel signal controller 3, the controls about the transmitting and receiving can be performed by means of function allotments like this invention. In this description we explain about No. 6 signal system for example, but it is evident that the idea according to the invention can be applied to the other general common channel signalling systems.

As described above, the common channel signal control system comprising the central processing unit 1 and the common channel signal controller 3 can demonstrate their remarkable abilities and can improve their operative efficiency, because the controls which are requested very severe real time controls but is relatively simple in their functions are allotted to the common channel signal controller 3, and the controls which are less requested the real time controls but are requested high grade logical operation are allotted to the central processing unit 1. This system is specially effective in the case that a great number of common channel signal channels are accommodated like an international transit switch, because in that case the load of the central processing unit 1 is reduced to a great extent.

While the principles of the invention have been described above in connection with specific embodiment, it is to be clearly understood that this description is made only by way of example and not as a limitation on the scope of the invention.

What we claim is:

1. A control system of an electronic exchange wherein signals are commonly transmitted through exclusive data channel comprising;

a. control operation of signal transmitted in said data channel being shared by a common channel signal controller and a central processing system having a stored-program type computer connected to said common channel signal controller, b. said common channel signal controller processing the job including synchronous control of received signal, error check of received signal, automatic transmission of acknowledge signal relating to the result of said error check, insertion of empty signal into sending signal, and process of empty signal derived from said received signal, c. said common channel signal controller processing said each job on time divisional basis, d. said central processing unit processing the job including to store the copy of transmitted information and to retransmit the same on request.

2. A common channel signal controller for a control system of an electronic exchange comprising;

a. a memory (M) storing information relating to signal, control and the result of error check for one block of received signal of each channel, b. a register (13) coupled to said memory (M), c. a scanning circuit (14) scanning each received channel and writing the information from each received channel to said memory (M), d. distribution circuit (15) distributing the information from said memory (M) and said register (13) to each designated channel, e. a counting circuit (11) connected to said scanning circuit (14), said distribution circuit (15) and said memory (M) through an address selection circuit (12), designating the channel number and the address of said memory (M), f. a coder.decoder (16) connected to said register (13) and said scanning circuit (14), providing error check of received signal and check bit of sending signal, g. an arithmetic circuit (17) connected to said register (13), providing the predetermined process to the information in said register (13), h. a comparison circuit (18) connected to said register (13) detecting empty signal unit in said register (13), i. a bit-pattern generator (19) connected to said register (13), providing empty signal unit, j. an input-output interface circuit connected to said register (13) providing interface facility between a central processing unit and a common channel signal controller.

* * * * *

UNITED STATES PATENT OFFICE
CERTIFICATE OF CORRECTION

Patent No. 3,818,450 Dated June 18, 1974

Inventor(s) Yukio Nakagome et al.

It is certified that error appears in the above-identified patent and that said Letters Patent are hereby corrected as shown below:

In the abstract, line 4, after "each", "speed" should read -- speech --. Column 7, line 52, "M5" should read -- M4 --.

Signed and sealed this 29th day of October 1974.

(SEAL)
Attest:

McCOY M. GIBSON JR.
Attesting Officer

C. MARSHALL DANN
Commissioner of Patents